United States Patent

Saeki et al.

[11] Patent Number: 5,977,273
[45] Date of Patent: Nov. 2, 1999

[54] PROCESS FOR SUSPENSION POLYMERIZATION OF VINYL CHLORIDE WITH CARBOXYL CONTAINING POLYVINYL-ALCOHOL

[75] Inventors: Masaru Saeki, Kobe; Kizo Onishi, Hirakata; Shunro Hayashi, Shiga-ken, all of Japan

[73] Assignee: Nippon Gohsei Kagaku Kogyo Kabushiki Kaisha, Osaka, Japan

[21] Appl. No.: 09/074,650

[22] Filed: May 8, 1998

Related U.S. Application Data

[62] Division of application No. 08/407,048, Mar. 17, 1995, Pat. No. 5,780,547, which is a continuation of application No. 07/924,466, Aug. 4, 1992, abandoned.

[30] Foreign Application Priority Data

Aug. 6, 1991 [JP] Japan .................................. 3-222055

[51] Int. Cl.⁶ ...................................................... C08F 2/20
[52] U.S. Cl. ........................................ 526/202; 526/344.2
[58] Field of Search ...................................... 526/202, 201

[56] References Cited

U.S. PATENT DOCUMENTS

| | | | |
|---|---|---|---|
| 2,715,590 | 8/1955 | Brockman | 525/57 |
| 3,523,933 | 8/1970 | Inskip | 525/60 |
| 3,689,466 | 9/1972 | Bridgeford . | |
| 3,689,469 | 9/1972 | Inskip . | |
| 3,817,959 | 6/1974 | Balewé | 526/202 |
| 4,172,930 | 10/1979 | Kajitani et al. . | |
| 4,401,790 | 8/1983 | ter Jung et al. . | |
| 4,678,832 | 7/1987 | Pospich et al. | 525/60 |
| 5,019,609 | 5/1991 | Toyonishi et al. | 524/35 |

FOREIGN PATENT DOCUMENTS

| | | |
|---|---|---|
| 50-32355 | 10/1975 | Japan . |
| 51-45189 | 4/1976 | Japan . |
| 57-59242 | 12/1982 | Japan . |

*Primary Examiner*—Christopher Henderson
*Attorney, Agent, or Firm*—Varndell Legal Group

[57] ABSTRACT

A dispersing stabilizer suitable for suspension polymerization of vinyl chloride or a monomer mixture mainly composed of vinyl chloride which can be used in a hot water charging polymerization process without any problems, and which can produce vinyl chloride homopolymer or copolymers having a good porosity, a large bulk density, a very low content of coarse particles and good physical properties, the dispersing stabilizer comprising a polyvinyl alcohol having a degree of hydrolysis of 75 to 85% by mole, an absorbance of not less than 0.1 measured at a wavelength of 280 m$\mu$with respect to the 0.1% by weight aqueous solution, a content of carboxyl group of 0.01 to 0.15% by mole and a cloud point of not less than 50° C. measured with respect to the 0.1% by weight aqueous solution

4 Claims, No Drawings

PROCESS FOR SUSPENSION POLYMERIZATION OF VINYL CHLORIDE WITH CARBOXYL CONTAINING POLYVINYL-ALCOHOL

CROSS REFERENCE TO RELATED APPLICATIONS

This application is a divisional application of Ser. No. 08/407,048 filed Mar. 17, 1995, now U.S. Pat. No. 5,780,547 which is a continuation application of Ser. No. 07/924,466, filed Aug. 4, 1992, now abandoned.

BACKGROUND OF THE INVENTION

The present invention relates to an agent for stabilizing dispersion (hereinafter referred to as "dispersing stabilizer") in suspension polymerization of vinyl chloride monomer alone or a mixture containing a major amount of the monomer, and a process for preparing the same. More particularly, the invention relates to a dispersing stabilizer for homo- or co-polymerization of vinyl chloride, which enables to produce a vinyl chloride resin having good physical properties such as a large porosity, a large bulk density and a uniform distribution of particle size with a less amount of coarse particles. Further, the invention relates to a process for the suspension polymerization of vinyl chloride or its mixture in the presence of the stabilizer, particularly the process which is improved in producibility by adopting a hot water charging polymerization manner to raise the efficiency of polymerization cycle.

In a suspension polymerization of vinyl chloride or a mixture of vinyl chloride and other monomers copolymerizable therewith, it is necessary to employ one or more of various dispersing stabilizers, e.g. polyvinyl alcohol, methylolcellulose, vinyl acetate/maleic anhydride copolymer, and gelatin. Above all, polyvinyl alcohols have excellent properties as the dispersing stabilizer, and are the most generally employed. While there are various polyvinyl alcohols, it is known that the physical or chemical characteristics of polyvinyl alcohols, such as average degree of polymerization and average degree of hydrolysis, have a delicate influence upon the produced vinyl chloride resins. So, a number of proposals have been made for the purpose, for example, (a) a polyvinyl alcohol defined by degree of hydrolysis, degree of polymerization, content of carbonyl group and content of vinylene group within specified ranges (Japanese Unexamined Patent Publication Kokai No. 45189/1976), and (b) a polyvinyl alcohol modified by maleic acid and/or an ester of maleic acid (Japanese Examined Patent Publication Kokoku No. 59242/1982).

In general, the suspension polymerization of vinyl chloride has been carried out in a batchwise operation, wherein a polymerization vessel is charged with a water medium, a dispersing stabilizer, a polymerization initiator, vinyl chloride or its mixture, and optionally other necessary additives, followed by gradually raising the temperature of the mixture up to the polymerization temperature to carry out the polymerization Such a batchwise operation, however, requires a very long time to feed the ingredients and to raise the temperature, which may sometimes account for 10% or more of the polymerization time in one cycle. It is a cause of decrease in productivity of the polymerization, which is a problem long wanted to be solved in the art. In order to solve the problem, various processes have been proposed. Recently, there is proposed a "hot water charging polymerization process", in which a hot water heated at 50° C. or higher temperature is employed. This process has great effects in points of process steps for polymerization and shortening of time.

However, when suspension polymerization is carried out in such a hot water charging manner employing the above-mentioned polyvinyl alcohol (a) or (b) as the dispersing stabilizer, on feeding hot water, the polyvinyl alcohol is partly deposited out to make the aqueous solution turbid. Thus, not only cannot the polyvinyl alcohol produce its excellent effects as the stabilizer, but also it often affect adversely the polymerization stability and physical properties of the produced polymers.

Accordingly, a dispersing stabilizer, suitable for use in the hot water charging polymerization process and always capable of yielding vinyl chloride resins having good qualities, has been strongly demanded, since it would enable to advantageously carry out the suspension polymerization.

It is an object of the present invention to provide a dispersing stabilizer suitable for suspension homo- or co-polymerization of vinyl chloride, which can be used in the hot water charging polymerization process without causing any problem and give vinyl chloride resins of high quality.

A further object of the invention is to provide a process for preparing the dispersing stabilizer for suspension polymerization of vinyl chloride.

A still further object of the invention is to provide a process for the suspension homo- or copolymerization of vinyl chloride which can stably produce vinyl chloride resins having a high porosity, a high bulk density and a uniform distribution of particle size in a shortened period of time.

Another object of the invention is to provide a process for suspension-polymerizing vinyl chloride or its mixture with other copolymerizable monomers in hot water charging polymerization manner.

These and other objects of the present invention will become apparent from the description hereinafter.

SUMMARY OF THE INVENTION

It has been found that when a polyvinyl alcohol has specific properties, i.e. degree of hydrolysis, content of carbonyl group, content of carboxyl group and cloud point, which fall within the specified ranges, respectively, is used a dispersing stabilizer for suspension polymerization of vinyl chloride or its mixture with other copolymerizable monomers, the polymerization can be conducted stably, even in a hot water charging polymerization manner, without depositing the polyvinyl alcohol or making the solution cloudy, and there can be obtained a vinyl chloride resin having excellent properties, e.g. a high porosity, and having a uniform distribution of particle size without containing coarse particles.

In accordance with the present invention, there is provided a dispersing stabilizer for suspension homopolymerization or copolymerization of vinyl chloride, comprising a polyvinyl alcohol having a degree of hydrolysis of 75 to 85% by mole, an absorbance of not less than 0.1 measured at a wavelength of 280 m$\mu$ with respect to the 0.1% by weight aqueous solution, a content of carboxyl group of 0.01 to 0.15% by mole and a cloud point of not less than 50° C. measured with respect to the 0.1% by weight aqueous solution.

The polyvinyl alcohol used as the dispersing 15 stabilizer is prepared by heat-treating a polyvinyl alcohol, preferably a carbonyl group-containing polyvinyl alcohol, in the presence of sodium acetate at a temperature of 120° C. to 150° C. in an atmosphere containing 1 to 15% by volume of oxygen, thereby introducing carboxyl group.

The dispersing stabilizer of the present invention can be used in suspension polymerization of vinyl chloride alone or a monomer mixture containing a major amount of vinyl chloride, and is particularly suitable for use in producing vinyl chloride resins in a hot water charging manner wherein the polymerization is started by adding a hot water to a mixture of a monomer, a polymerization initiator and a dispersing stabilizer to raise the temperature of the polymerization system to a desired polymerization temperature.

It is important in obtaining the advantageous effects as mentioned above that the degree of hydrolysis, content of carbonyl group, content of carboxyl group and cloud point of the polyvinyl alcohol fall within the specified ranges.

DETAILED DESCRIPTION

The polyvinyl alcohol used as the dispersing stabilizer according to the invention is usually prepared by polymerizing vinyl acetate in the presence of a chain transfer agent, such as an aldehyde, a ketone or the like, followed by hydrolyzing the obtained vinyl acetate polymer to provide a polyvinyl alcohol containing carbonyal group, and heat-treating the carbonyl group-containing polyvinyl alcohol in the presence of sodium acetate, preferably not more than 2% by weight of sodium acetate based on the polyvinyl alcohol, in an atmosphere having a specified oxygen concentration to introduce carboxyl groups into the polyvinyl alcohol. The production of the carbonyl group-containing polyvinyl alcohol is not limited to the above-mentioned process using chain transfer agents such as aldehydes or ketones. For example, carbonyl group-containing polyvinyl alcohols may be produced by heat-treating usual polyvinyl alcohols containing no carbonyl group. It is also known that polyvinyl alcohols produced in a usual manner may contain carbonyl group by various causes or mechanisms, e.g. acetaldehyde impurity included in vinyl acetate monomer and disproportionation termination reaction Accordingly, any polyvinyl alcohols can be used as the starting material in the present invention, so long as polyvinyl alcohols containing both carbonyl groups and carboxyl group are obtained therefrom by the above-mentioned heat treatment, thus providing polyvinyl alcohols having desired properties.

Examples of the aldehyde used as the chain transfer agent in the polymerization of vinyl acetate are for instance, acetaldehyde, propionaldehyde, butylaldehyde, benzaldehyde, and the like. Examples of the ketone used as the chain transfer agent are, for instance, acetone, methyl ethyl ketone, hexanone, cyclohexanone, and the like. The amount of the chain transfer agent varies to some extent depending on its chain transfer constant or the desired degree of polymerization of polyvinyl alcohol. It is usually from 0.1 to 5% by weight, preferably 0.5 to 3% by weight, based on the vinyl acetate monomer.

The polymerization of vinyl acetate can be conducted in any known manner without particular restriction Usually, the polymerization is conducted in a solution polymerization manner employing as the solvent an alcohol such as methanol, ethanol or isopropanol. Of course, an emulsion polymerization and suspension polymerization may also be adopted. In such a solution polymerization, vinyl acetate monomer may be fed at one time, continuously, intermittently or in any other manner. The solution polymerization is conducted in the presence of azobisisobutyronitrile, acetyl peroxide, benzoyl peroxide, lauroyl peroxide or other known radical polymerization catalysts. The polymerization temperature is selected from about 50° C. to the boiling point of the reaction mixture.

Vinyl acetate may be polymerized alone, or may be copolymerized with other monomers copolymerizable with vinyl acetate, e.g. an unsaturated carboxylic acid or its alkyl ester, such as acrylic acid, methacrylic acid, crotonic acid, maleic acid or a monoalkyl maleate; a nitrile such as acrylonitrile or methacrylonitrile, an amide such as acrylamide methacrylamide; an olefinsulfonic acid or its salt such as ethylenesulfonic acid, allylsulfonic acid or methallylsulfonic acid; a vinyl ester other than vinyl acetate; a vinyl ester of a saturated branched fatty acid; a vinyl ether; a vinyl ketone; an α-olefin; a vinyl halide; a vinylidene halide; or the like. The amount of the other copolymerizable monomers is usually at most 10% by mole, preferable at most 5% by mole.

The hydrolysis of a vinyl acetate polymer is conducted by dissolving the vinyl acetate polymer in an alcohol and adding an alkali catalyst or an acid catalyst to the solution As an alcohol are used, for example methanol, ethanol and butanol.

The concentration of the vinyl acetate polymer in the alcohol solution is from 20 to 50% by weight. Examples of the alkali catalyst are, for instance sodium hydroxide, potassium hydroxide, sodium methylate, sodium ethylate, potassium methylate, and other alkali metal hydroxides or alcoholates. Examples of the acid catalyst are, for instance, an inorganic acid such as hydrochloric acid or sulfuric acid, and an organic acid such as p-toluene sulfonic acid. The amount of such a catalyst is needed to be 1 to 100 millimole equivalents to vinyl acetate unit. The hydrolysis temperature is not particularly limited, but usually selected from 10° to 70° C., preferably from 30° to 40° C. The reaction is usually conducted for 2 to 3 hours.

The heat treatment to introduce carboxyl groups into polyvinyl alcohol is conducted in an oxygen atmosphere having an oxygen concentration of 1 to 15% by volume, preferably 3 to 12% by volume, at a temperature of 120° to 150° C. for 0.5 to 5 hours. If the oxygen concentration is higher than the above range, the carboxyl group is introduced in excess, so the obtained polyvinyl alcohol is easy to deposite. If the heat treatment temperature is lower than 120° C., the desired amount of carboxyl group is not introduced, and if it is higher than 150° C., the polymer is cross-linked to form insoluble substance causing to develop fish eyes in molded articles of polyvinyl chloride resins.

The polyvinyl alcohol used as the dispersing stabilizer is required to be a partially hydrolyzed polyvinyl alcohol having a carbonyl group content such that the absorbance of a 0.1% by weight aqueous solution thereof is not less than 0.1 at a wavelength of 280 mμ, and having a degree of hydorlysis of 75 to 85% by mole, a content of carboxyl group of 0.01 to 0.15% by mole, and a cloud point of not less than 50° C. measured with respect to a 0.1% by weight aqueous solution thereof.

When the absorbance is less than 0.1, the stabilizer does not provide vinyl chloride resins having a high good plasticizer absorptivity. If the degree of hydrolysis is less than 75% by mole, the cloud point is low and, therefore, no good effects as dispersing stabilizer are not exhibited when used in the hot water charging polymerization process. If the degree of hydrolysis is more than 85% by mole, the polyvinyl alcohol lacks in dispersing ability, so the obtained vinyl chloride resins are not satisfactory in properties such as porosity and distribution of particle size. Also, if the content of carboxyl group is lower than 0.01% by mole, the polyvinyl alcohol is hard to keep the cloud point at not lower than 50° C., and if the content is higher than 0.15% by mole, the suspension polymerization of vinyl chloride is not stably conducted, resulting in lowering of the physical properties of the obtained vinyl chloride resins.

The polyvinyl alcohol having a cloud point lower than 50° C. is not suitable for use in the suspension polymerization in the hot water charging manner, because there are observed phenomena of depositing polyvinyl alcohol from a polymerization system and making the system turbid when a hot water above 50° C. is added to the system. The term "cloud point" as used herein means the temperature at which a 0.1% by weight aqueous solution of a polyvinyl alcohol begins to become cloudy when the temperature is raised from about 20° C. at a rate of 0.5° C. per minute.

By using a dispersing stabilizer comprising the polyvinyl alcohol as mentioned above in a suspension homo- or copolymerization of vinyl chloride, there are obtained vinyl chloride homopolymer or copolymers having excellent properties such that the polymer particles are porous, the distribution of particle size is uniform, and they do not form fish eyes in the molded articles.

In regard to the hot water charging polymerization process, some embodiments are given below, specifically to illustrate the present invention, but it is to be understood that the invention is not limited to these embodiments.

(1) In an embodiment, a polymerization initiator, a dispersing stabilizer for suspension polymerization, other additives and a monomer, namely vinyl chloride or a mixture of vinyl chloride with other copolymerized monomers (hereinafter referred to as "vinyl chloride monomer") are uniformly mixed at a temperature lower than that at which the initiator is substantially decomposed. Water heated at a temperature not less than 50° C. is then added to the mixture with stirring to initiate the polymerization (cf. Japanese Unexamined Patent Publication Kokai No. 5703/1982).

(2) In a second embodiment, a polymerization vessel is charged with a polymerization initiator, a dispersing stabilizer for suspension polymerization, other additives, and a cold water not higher than about 30° C. in an amount of about 5 to about 50% by weight of the whole amount of water to be employed for the polymerization system. The order of addition of these materials is not particularly limited. After adding these components, the polymerization vessel is usually degassed to remove air present in the polymerization vessel. Vinyl chloride monomer is then fed into the polymerization vessel. At last, the residual amount of water, namely about 95 to about 50% by weight of the whole water to be employed, which has been heated at a temperature above the polymerization temperature (not less than 50° C.), is added to the polymerization system (cf. Japanese Unexamined Patent Publication No. 47785/1979).

(3) In a preliminary mixing vessel, there are fully mixed at a temperature below 50° C., a polymerization initiator, a dispersing stabilizer for suspension polymerization, other additives, water and a vinyl chloride monomer. The preliminary mixture is continuously preheated with a heat exchanger and sent to a polymerization vessel so as to heat the mixture such that at the moment the mixture is fed to the polymerization vessel, the temperature of the mixture reaches the polymerization temperature (cf. Japanese Unexamined Patent Publication Kokai No. 158207/1985).

In these processes, the dispersing stabilizer is added in the form of powder or solution. When added in the form of a solution, it is dissolved in water, or an organic solvent such as an alcohol, a ketone or an ester, or a mixture of an organic solvent with water. The amount of the dispersing stabilizer employed is from 0.01 to 0.3% by weight, preferably 0.03 to 0.1% by weight, based on the vinyl chloride monomer. The polyvinyl alcohol according to the invention may be used as the dispersing stabilizer in combination with other known dispersing stabilizers. The other stabilizers should be used in an amount appropriate in view of the desired properties of the vinyl chloride resins to be produced. The other stabilizers include, for instance, cellulose derivatives such as methyl cellulose, hydroxylethyl cellulose, hydroxypropyl cellulose and hydroxypropyl methyl cellulose; partially hydrolyzed polyvinyl alcohols; partially hydrolyzed polyvinyl acetates; polyacrylic or polymethacrylic acid polymers; gelatin; sorbitan fatty acids; polyethers mixrures; and the like. These other stabilizers may be used alone or in admixture thereof.

As the polymerization initiators, there can be employed those conventionally used in the polymerization of vinyl chloride monomer. Examples of the initiator are, for instance, percarbonates such as di-isopropyl peroxydicarbonate, di-2-ethylhexyl peroxydicarbonate and diethoxyethyl peroxydicarbonate; peresters such as t-butyl peroxyneodecanoate, α-cumyl peroxyneodecanoate and t-butyl peroxyneodecanoate; peroxides such as acetyl cyclohexanesulfonyl peroxide and 2,4,4-trimethylpentyl 2-peroxyphenoxyacetate; azo compounds such as azobis-(2, 4-dimethylvaleronitrile) and azobis-(4-methoxy-2,4-dimethylvaleronitrile); and the like. In addition, potassium persulfate, ammonium persulfate, hydrogen peroxide or a mixture thereof can be employed.

In the suspension polymerization, known additives conventionally used for polymerization of vinyl chloride may be optionally used, e. g. polymerization regulator, chain transfer agent, gelation modifier, antistatic agent, pH regulator and the like.

Vinyl chloride may be homopolymerized or copolymerized with other copolymerizable monomers by the process according to the invention. The comonomers copolymerizable with vinyl chloride is used in an amount of less than 50% by weight based on the whole monomers. Examples of the comonomer are, for instance, vinyl esters such as vinyl acetate, vinyl propionate and the like; acrylate esters or methacrylate esters such as methyl acrylate, ethyl acrylate and the like; olefins such as ethylene, propylene and the like; maleic anhydride, acrylonitrile, styrene, vinylidene chloride, and other monomers copolymerizable with vinyl chloride.

In carrying out the process of the invention, the feeding ratio of ingredients, the polymerization temperature and the other conditions can be determined according to the conditions that have been adopted in conventional suspension polymerizations of vinyl chloride monomer, and they are not particularly limited.

The dispersing stabilizer according to the invention have various advantages. For example, it enables to polymerize vinyl chloride monomer in a hot water charging polymerization manner. Also it can provide vinyl chloride homopolymer or copolymers having a good porosity, a uniform distribution of particle size and excellent physical properties, and the molded articles prepared therefrom has no or a very few fish eyes.

The present invention is more specifically described and explained by means of the following Examples, in which all % and parts are by weight unless otherwise noted. It is to be understood that the present invention is not limited to the Examples.

EXAMPLE 1

[Preparation of dispersing stabilizer]

A polymerization vessel was charged with 100 parts of vinyl acetate, 1.2 parts of acetaldehyde, 5 parts of methanol and 0.07% of, based on vinyl acetate, azobisisobutyronitrile. After the atmosphere in the polymerization vessel was replaced by nitrogen, the mixture was heated to a temperature of 50° to 70° C. to initiate polymerization and the polymerization was continued at that temperature until the polymerization conversion reached 90%.

Unreacted vinyl acetate was removed, and the obtained polymer was hydrolyzed with sodium hydroxide according to a common method to form a partially hydrolyzed polyvinyl alcohol.

Then, 1.5 parts of sodium acetate was added to 100 parts of the obtained partially hydrolyzed polyvinyl alcohol. After the mixture was dried at a powder temperature of 110° C. for 2 hours, it was placed in a reactor, and heat-treated at 145° C. for 2 hours with keeping the oxygen concentration at 10% by volume by passing through the reactor a mixed gas of nitrogen and air in a volume ratio of 1:1 at a rate of 100 l/hour. The properties of the obtained polyvinyl alcohol are as follows:

| | |
|---|---|
| Degree of polymerization | 1000 |
| Degree of hydrolysis | 79.0% by mole |
| Absorbance at 280 mµ of 0.1% aqueous solution thereof | 0.5 |
| Content of carboxyl group | 0.08% by mole |
| Cloud point | 60° C. |

[Suspension polymerization of vinyl chloride]

Into a 100 l stainless steel autoclave equipped with a stirrer were simultaneously fed with stirring 30 parts of 30° C. cold water, 100 parts of vinyl chloride, 0.1 part of the polyvinyl alcohol obtained above as a dispersing stabilizer and 0.2 part of di-2-ethylhexyl peroxydicarbonate as a polymerization initiator, and subsequently 120 parts of hot water heated at 85° C. was added to the autoclave and the suspension polymerization was carried out at 58° C.

The properties of the obtained polyvinyl chloride were measured according to the following methods. The results are shown in Table 1.

1. Porosity

Porosity was measured by a mercury porosity meter.

2. Bulk density

Bulk density was measured according to JIS K 6721.

3. Absorption of plasticizer

A dry up time of a mixture of 6 parts of vinyl chloride resin and 4 parts of diethylhexyl phthalate was measured with a Brabender. The plasticizer absorptivity was estimated according to the following criteria.

| | |
|---|---|
| A | dry up time in 3 minutes |
| B | dry up time longer than 3 minutes and not longer than 5 minutes |
| C | dry up time longer than 5 minutes and not longer than 10 minutes |

4. Fish eye

A mixture of 100 parts of the vinyl chloride resin, 1.0 part of lead stearate, 1.0 part of barium stearate, 50 parts of dioctyl phthalate and 0.8 part of carbon black was kneaded with rolls at 150° C. for 6 minutes to form into a sheet having a thickness of 0.08 mm. The number of fish eyes in the area of 5×4 cm of the obtained sheet was counted. The estimation was made according to the following criteria.

| | |
|---|---|
| A | fish eyes from 0 to 4 |
| B | fish eyes from 5 to 10 |
| C | fish eyes exceeding 11 |

5. Distribution of particle size

The particle size distribution is estimated by a content (%) of coarse particles which did not pass through the JIS standard 42 mesh sieve. The representations are as follows:

| | |
|---|---|
| A | content of 42 mesh on particles not more than 1% |
| B | content of 42 mesh on particles more than 1% and not more than 5% |
| C | content of 42 mesh on particles than 5% |

EXAMPLE 2

A dispersing stabilizer was prepared in the manner as in Example 1 except that the conditions of the heat treatment in an oxygen atmosphere were changed.

That is to say, a partially hydrolyzed polyvinyl alcohol was prepared by using 100 parts of vinyl acetate, 1.2 parts of acetaldehyde, 5 parts of methanol and 0.07% of, based on vinyl acetate, azobisisobutyronitrile. Then, 1.5 parts of sodium acetate was added to 100 parts of the obtained partially hydrolyzed polyvinyl alcohol, and after the mixture was dried at a powder temperature of 110° C. for 2 hours, it was thermally treated in a reactor at 145° C. for 2 hours with keeping the oxygen concentration at 5% by volume by passing through the reactor a mixed gas of nitrogen and air in a volume ratio of 1:0.5 at a rate of 100 l/hour.

The properties of the obtained polyvinyl alcohol are as follows:

| | |
|---|---|
| Degree of polymerization | 1000 |
| Degree of hydrolysis | 79.0% by mole |
| Absorbance at 280 mµ of 0.1% by weight aqueous solution thereof | 0.30 |
| Content of carboxyl group | 0.05% by mole |
| Cloud point | 55° C. |

A polyvinyl chloride resin was prepared in the same manner as in Example 1 except that the thus obtained polyvinyl alcohol was employed as the dispersing stabilizer. The properties of the obtained polyvinyl chloride are shown in Table 1.

EXAMPLE 3

A partially hydrolyzed polyvinyl alcohol was prepared in the same manner as in Example 1 except that 100 parts of vinyl acetate, 20 parts of methanol and 0.02% of, based on vinyl acetate, azobisisobutyronitrile were used.

Then, 1.5 parts of sodium acetate was added to 100 parts of the obtained partially hydrolyzed polyvinyl alcohol, and after the mixture was dried at a powder temperature of 110° C. for 2 hours, it was thermally treated in a reactor at 145° C. for 2 hours with keeping the oxygen concentration at 10% by volume by passing through the reactor a mixed gas of nitrogen and air in a volume ratio of 1:1 at a rate of 100 l/hour.

The properties of the obtained polyvinyl alcohol are as follows:

| | |
|---|---|
| Degree of polymerization | 1700 |
| Degree of hydrolysis | 80.5% by mole |
| Absorbance at 280 mμ of 0.1% aqueous solution thereof | 0.20 |
| Content of carboxyl group | 0.05% by mole |
| Cloud point | 62° C. |

A vinyl chloride resin was prepared in the same manner as in Example 1 except that the thus obtained polyvinyl alcohol was employed as the dispersing stabilizer. The results of the measurement of properties of the obtained vinyl chloride resin are shown in Table 1.

Comparative Example 1

A partially hydrolyzed polyvinyl alcohol was prepared in the same manner as in Example 1 except that 100 parts of vinyl acetate, 1.5 parts of acetaldehyde, 5 parts of methanol and 0.08% of, based on vinyl acetate, azobisisobutyronitrile were used.

Then, 2.0 parts of sodium acetate was added to 100 parts of the obtained partially hydrolyzed polyvinyl alcohol, and after the mixture was dried at a powder temperature of 110° C. for 2 hours, it was thermally treated in a reactor at 145° C. for 2 hours with keeping the oxygen concentration at 20% by volume by passing through the reactor a mixed gas of nitrogen and air in a volume ratio of 1:2 at a rate of 100 l/hour.

The properties of the obtained polyvinyl alcohol are as follows:

| | |
|---|---|
| Degree of polymerization | 800 |
| Degree of hydrolysis | 80.1% by mole |
| Absorbance at 280 mμ of 0.1% aqueous solution thereof | 0.70 |
| Content of carboxyl group | 0.20% by mole |
| Cloud point | 60° C. |

A vinyl chloride resin was prepared in the same manner as in Example 1 except that the thus obtained polyvinyl alcohol was employed as the dispersing stabilizer. The results of the measurement of properties of the obtained vinyl chloride resin are shown in Table 1.

Comparative Example 2

A dispersing stabilizer was prepared in the manner as in Example 1, except that the conditions of the heat treatment in an oxygen atmosphere were changed.

That is to say, a partially hydrolyzed polyvinyl alcohol was prepared by using 100 parts of vinyl acetate, 1.2 parts of acetaldehyde, 5 parts of methanol and 0.07% of, based on vinyl acetate, azobisisobutyronitrile. Then, 1.5 parts of sodium acetate was added to 100 parts of the obtained partially hydrolyzed polyvinyl alcohol, and after the mixture was dried at a powder temperature of 110° C. for 2 hours. It was thermally treated in a reactor at 90° C. for 2 hours with keeping the oxygen concentration at 10% by volume by passing through the reactor a mixed gas of nitrogen and air in a volume ratio of 1:1 at a rate of 100 l/hour.

The properties of the obtained polyvinyl alcohol are as follows:

| | |
|---|---|
| Degree of polymerization | 1000 |
| Degree of hydrolysis | 71% by mole |
| Absorbance at 280 mμ of 0.1% aqueous solution thereof | 0.25 |
| Content of carboxyl group | 0.03% by mole |
| Cloud point | 40° C. |

A vinyl chloride resin was prepared in the same manner as in Example 1 except that the thus obtained polyvinyl alcohol was employed as the dispersing stabilizer. The properties of the obtained vinyl chloride resin are shown in Table 1.

Comparative Example 3

A partially hydrolyzed polyvinyl alcohol was prepared in the same manner as in Example 1 except that 100 parts of vinyl acetate, 20 parts of methanol and 0.02% of, based on vinyl acetate, azobisisobutyronitrile were used.

Then 0.3 parts by weight of sodium acetate was added to 100 parts of the obtained partially hydrolyzed polyvinyl alcohol, and after the mixture was dried at a powder temperature of 110° C. for 2 hours, no heat treatment was conducted.

The properties of the obtained polyvinyl alcohol are as follows:

| | |
|---|---|
| Degree of polymerization | 1000 |
| Degree of hydrolysis | 79.2% by mole |
| Absorbance at 280 mμ of 0.1% aqueous solution thereof | 0.03 |
| Content of carboxyl group | 0.01% by mole |
| Cloud point | 45° C. |

A vinyl chloride resin was prepared in the same manner as in Example 1 except that the thus obtained polyvinyl alcohol was employed as the dispersing stabilizer. The results of the measurement of properties of the obtained vinyl chloride resin are shown in Table 1.

TABLE 1

| | Porosity (cc/g) | Bulk density (g/ml) | Distribution of particle size | Fish eye | Plasticizer absorptivity |
|---|---|---|---|---|---|
| Example 1 | 0.38 | 0.56 | A | A | A |
| Example 2 | 0.35 | 0.57 | A | A | A |
| Example 3 | 0.32 | 0.60 | A | A | A |
| Com. Ex. 1 | 0.26 | 0.51 | C | B | B |
| Com. Ex. 2 | 0.27 | 0.48 | C | B | B |
| Com. Ex. 3 | 0.25 | 0.54 | B | C | C |

By using the dispersing stabilizer according to the present invention, it is possible to conduct a suspension polymerization in a hot water charging manner. The obtained vinyl chloride resins have a good porosity, a uniform distribution of particle size such that they provide molded articles having no or few fish eye, and have excellent physical properties, so the dispersing stabilizer is industrially very advantageous.

What we claim is:

1. A process for the suspension polymerization of vinyl chloride or a mixture of vinyl chloride and a minor amount of other monomer copolymerizable with vinyl chloride, which comprises carrying out the polymerization in the presence of a dispersing stabilizer, said dispersing stabilizer comprising a polyvinyl alcohol having a degree of hydrolysis of 75 to 85% by mole, an absorbance of not less than 0.1 measured at a wavelength of 280 mµ with respect to the 0.1% by weight aqueous solution, a content of carboxyl group of 0.01 to 0.15% by mole and a cloud point of not less than 50° C. measured with respect to the 0.1% by weight aqueous solution.

2. A process for the suspension polymerization of vinyl chloride or a mixture of vinyl chloride and a minor amount of other monomer copolymerizable with vinyl chloride, which comprises feeding into a polymerization vessel a polymerization initiator, a dispersing stabilizer and a monomer, mixing them and adding to the resulting uniform mixture a water medium not less than 50° C. to initiate the polymerization, said dispersing stabilizer comprising a polyvinyl alcohol having a degree of hydrolysis of 75 to 85% by mole, an absorbance of not less than 0.1 measured at a wavelength of 280 mµ with respect to the 0.1% by weight aqueous solution, a content of carboxyl group of 0.01 to 0.15% by mole and a cloud point of not less than 50° C. measured with respect to the 0.1% by weight aqueous solution.

3. A process for the suspension polymerization of vinyl chloride or a mixture of vinyl chloride and a minor amount of other monomer copolymerizable with vinyl chloride, which comprises feeding into a polymerization vessel a polymerization initiator, a dispersing stabilizer and water not more than 30° C., feeding a monomer, subsequently feeding hot water heated at a temperature not less than the polymerization temperature and continuing the polymerization, said dispersing stabilizer comprising a polyvinyl alcohol having a degree of hydrolysis of 75 to 85% by mole, an absorbance of not less than 0.1 measured at a wavelength of 280 mµ with respect to the 0.1% by weight aqueous solution, a content of carboxyl group of 0.0 1 to 0.15% by mole and a cloud point of not less than 50° C. measured with respect to the 0.1% by weight aqueous solution.

4. A process for the suspension polymerization of vinyl chloride or a mixture of vinyl chloride and a minor amount of other monomer copolymerizable with vinyl chloride, which comprises mixing a polymerization initiator, a dispersing stabilizer, water and a monomer at a temperature of not more than 50° C., preheating the resulting mixture to a polymerization temperature, promptly feeding the preheated mixture into a polymerization vessel, and subsequently carrying out the polymerization in the polymerization vessel, said dispersing stabilizer comprising a polyvinyl alcohol having a degree of hydrolysis of 75 to 85% by mole, an absorbance of not less than 0.1 measured at a wavelength of 280 mµ with respect to the 0.1% by weight aqueous solution, a content of carboxyl group of 0.01 to 0.15% by mole and a cloud point of not less than 50° C. measured with respect to the 0.1% by weight aqueous solution.

* * * * *